United States Patent
Patel et al.

(10) Patent No.: US 9,310,629 B2
(45) Date of Patent: Apr. 12, 2016

(54) ELECTRO-OPTICAL MODULATOR WITH A VERTICAL CAPACITOR STRUCTURE

(71) Applicant: Cisco Technology, Inc.

(72) Inventors: Vipulkumar Patel, Breinigsville, PA (US); Prakash Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/266,397

(22) Filed: Apr. 30, 2014

(65) Prior Publication Data

US 2015/0212386 A1 Jul. 30, 2015

Related U.S. Application Data

(60) Provisional application No. 61/931,314, filed on Jan. 24, 2014.

(51) Int. Cl.
| | |
|---|---|
| *G02F 1/01* | (2006.01) |
| *G02F 1/035* | (2006.01) |
| *G02F 1/225* | (2006.01) |
| *G02F 1/025* | (2006.01) |
| *B82Y 20/00* | (2011.01) |
| *G02F 1/21* | (2006.01) |

(52) U.S. Cl.
CPC ............... *G02F 1/011* (2013.01); *G02F 1/025* (2013.01); *G02F 1/225* (2013.01); *B82Y 20/00* (2013.01); *G02F 2001/212* (2013.01); *Y10S 977/834* (2013.01)

(58) Field of Classification Search
CPC ......... G02F 1/011; G02F 1/025; G02F 1/225; G02F 1/2257
USPC .......................................................... 385/1–3
See application file for complete search history.

(56) References Cited

U.S. PATENT DOCUMENTS

| | | |
|---|---|---|
| 5,757,986 A | 5/1998 | Crampton et al. |
| 6,845,198 B2 | 1/2005 | Montgomery et al. |
| 7,442,589 B2 | 10/2008 | Yu et al. |
| 8,362,494 B2 | 1/2013 | Lo et al. |
| 8,363,986 B2 | 1/2013 | Webster et al. |
| 2003/0090286 A1 | 5/2003 | Samara-Rubio |
| 2009/0310901 A1* | 12/2009 | Dong ................................ 385/3 |
| 2011/0180795 A1* | 7/2011 | Lo et al. ........................ 257/51 |
| 2013/0058606 A1 | 3/2013 | Thomson et al. |

FOREIGN PATENT DOCUMENTS

DE 102004007251 A1 9/2005

OTHER PUBLICATIONS

Dong, Po et al., Low Vpp, ultralow-energy, compact, high-speed silicon electro-optic modulator, Optics Express, Dec. 7, 2009, vol. 17, No. 25, OSA, Washington DC, United States.
European Patent Office, International Search Report & Written Opinion, International Application No. PCT/US2015/012791, dated Apr. 13, 2015.
Gardes, F.Y. et al., 40 Gb/s silicon photonics modulator for TE and TM polarisations, Optics Express, 2011, vol. 19, Issue 12, pp. 11804-11814, Optics InfoBase, Washington, D.C., United States.

* cited by examiner

*Primary Examiner* — Ryan Lepisto
(74) *Attorney, Agent, or Firm* — Patterson & Sheridan, LLP

(57) ABSTRACT

An optical modulator may include a leftmost waveguide, a rightmost waveguide, and a dielectric layer disposed therebetween. In one embodiment, the waveguides may be disposed on the same plane. When a voltage potential is created between the rightmost and leftmost waveguides, these layers form a silicon-insulator-silicon capacitor (also referred to as SISCAP) structure that provides efficient, high-speed optical modulation of an optical signal passing through the modulator. As opposed to a horizontal SISCAP structure where the dielectric layer is disposed between upper and lower waveguides, arranging the dielectric layer between waveguides disposed on the same plane results in a vertical SISCAP structure. In one embodiment, the leftmost and rightmost waveguide are both made from crystalline silicon.

10 Claims, 8 Drawing Sheets

ELECTRO-OPTICAL MODULATOR WITH A VERTICAL CAPACITOR STRUCTURE

CROSS-REFERENCE TO RELATED APPLICATIONS

This application is a non-provisional application of co-pending U.S. provisional application Ser. No. 61/931,314, filed Jan. 24, 2014. The aforementioned related patent application is herein incorporated by reference in its entirety.

TECHNICAL FIELD

Embodiments presented in this disclosure generally relate to optical modulation and, more specifically, to silicon-based electro-optical modulators.

BACKGROUND

Many electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators and Fabry-Perot resonators, may be used to modulate the output intensity.

Free carrier concentration in electro-optic devices can be varied by injection, accumulation, depletion or inversion of carriers. Most of such devices investigated to date present some common features: they require long interaction lengths (for example, 5-10 mm) and injection current densities higher than 1 kA/cm$^3$ in order to obtain a significant modulation depth. Long interaction lengths are undesirable in order to achieve high levels of integration and miniaturization for fabricating low-cost compact device arrangements. High current densities may induce unwanted thermo-optic effects as a result of heating the structure and will, indeed, cause an opposite effect on the real refractive index change relative to that associated with free carrier movement, thus reducing its effectiveness.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
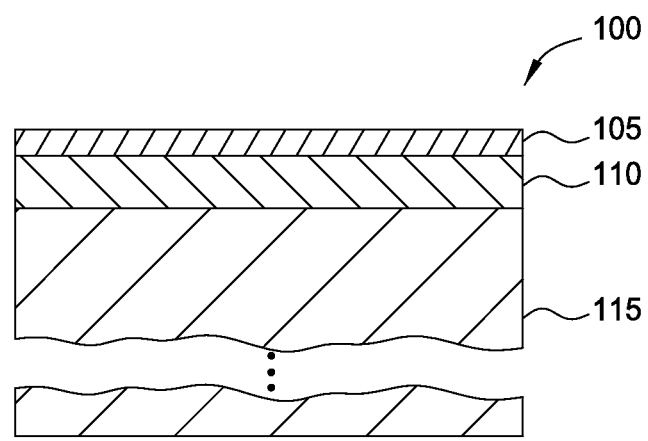
FIG. 1 illustrates a SOI device, according to one embodiment disclosed herein.

One embodiment presented in this disclosure is a method for forming an optical device. The method includes etching a crystalline silicon substrate disposed on an insulator to form both a right crystalline silicon waveguide and a left crystalline silicon waveguide where the right and left waveguides have respective lower surfaces contacting the insulator. After forming the right and left waveguides, the method includes depositing a dielectric material in a vertical gap between the right and left waveguides. Moreover, the left waveguide is doped a first conductivity type and the right waveguide is doped a second, different conductivity type.

Another embodiment described herein is an optical device that includes a right crystalline silicon waveguide disposed on a dielectric substrate and a left crystalline silicon waveguide disposed on the dielectric substrate where the right and left waveguides are disposed on a same plane defined by the dielectric substrate. The device also includes a vertical region separating the right and left waveguides. The vertical region extends vertically from the dielectric substrate to an upper surface of one of the right and left waveguides opposite a lower surface contacting the dielectric substrate. Moreover, the vertical region is filled with a dielectric material. In addition, the left waveguide is doped a first conductivity type and the right waveguide is doped a second, different conductivity type.

Another embodiment described herein is an optical device that includes a right waveguide disposed on a dielectric substrate and a left waveguide disposed on the dielectric substrate where the right and left waveguides are disposed on a same plane defined by the dielectric substrate and the left waveguide is doped a first conductivity type and the right waveguide is doped a second, different conductivity type. The optical device also includes a vertical region separating the right and left waveguides. The vertical region extends vertically from the dielectric substrate to an upper surface of one of the right and left waveguides opposite a lower surface contacting the dielectric substrate. Moreover, the vertical region is filled with a dielectric material. The optical device includes a dielectric ridge at least partially overlapping the vertical region where a width of the dielectric ridge is equal to or greater than a width of the vertical region.

Example Embodiments

An optical modulator may include a leftmost waveguide, a rightmost waveguide, and a dielectric layer disposed therebetween. In one embodiment, the waveguides may be disposed on the same plane. When a voltage potential is created between the rightmost and leftmost waveguides, these layers form a silicon-insulator-silicon capacitor (also referred to as SISCAP) structure that provides efficient, high-speed optical modulation of an optical signal passing through the modulator. As opposed to a horizontal SISCAP structure where the dielectric layer is disposed between upper and lower waveguides, arranging the dielectric layer between waveguides that are disposed on the same plane results in a vertical SISCAP structure. For example, the waveguides may be disposed on the same substrate.

In one embodiment, the waveguides are formed from the same crystalline silicon substrate. As such, both waveguides in the SISCAP structure are formed from crystalline silicon which may reduce the optical loss compared to a vertical SISCAP structure where one waveguide is made from crystalline silicon and the other is made from, for example, polysilicon.

FIG. 1 illustrates a Silicon-On-Insulator (SOI) device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure 100 shown here. Moreover, the surface layer 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. The thickness of the insulation layer 110 may directly depend on the size of the mode being coupled to the SOI device 100 and the desired efficiency. As such, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon nitride, and the like) may provide contrasting refractive indexes that vertically confine an optical signal in a waveguide in the surface layer 105. In a later processing step, the surface layer 105 of the SOI device 100 may be etched to form one or more silicon waveguides. Because silicon has a high refractive index compared to an insulator such as silicon dioxide, the optical signal remains primarily in the waveguide as it propagates across the surface layer 105.

Vertical SISCAP

Figure 2:
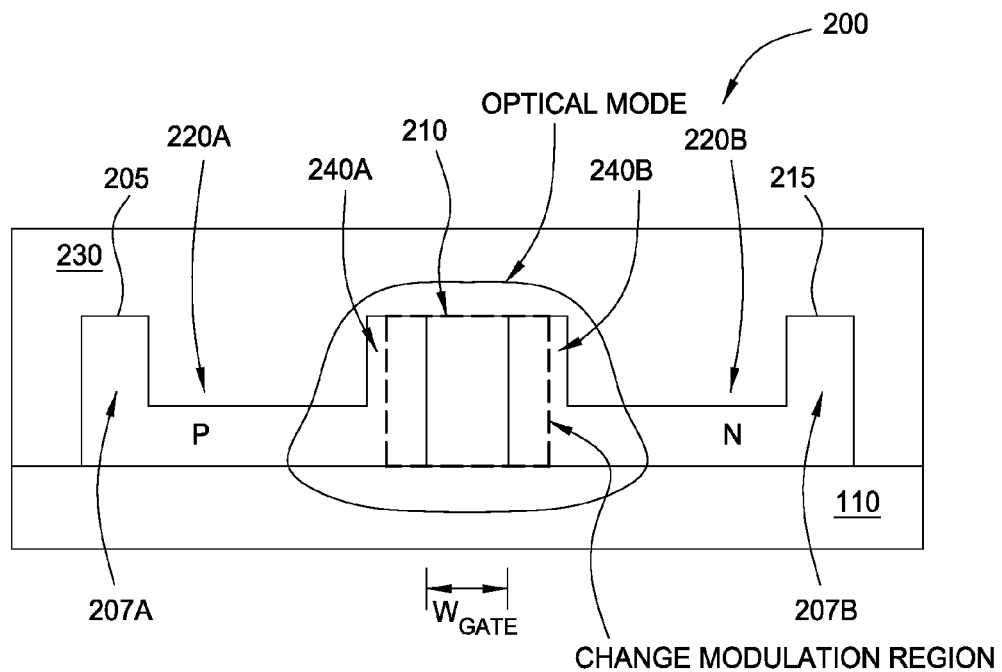
FIG. 2 illustrates a cross-sectional view of a modulator with a vertical charge modulation region, according to one embodiment disclosed herein.

FIG. 2 illustrates a cross-sectional view of a modulator 200 with a vertical charge modulation region, according to one embodiment disclosed herein. That is, instead of disposing at least some portion of the gate dielectric layer between an upper waveguide and a lower waveguide, here, the gate dielectric layer is arranged between waveguides that are disposed on the same horizontal plan thereby establishing a primarily vertical charge modulation region. As shown, the modulator 200 includes a left waveguide 205, a gate dielectric region 210, and a right waveguide 215 disposed on a common substrate—i.e., insulation layer 110. Like the upper and lower waveguides discussed in the embodiments above, the waveguides 205, 215 may be silicon-based and can include strained silicon, SixGe1-x, substantially single crystal silicon (i.e., crystalline silicon), polycrystalline silicon, and combinations thereof. However, as will be discussed in more detail below, forming the waveguides 205 such that they are side-by-side permits both waveguides to be made of the same material—e.g., crystalline silicon—but this is not a requirement. Additionally, the waveguides 205 and 215 are doped with dopants that have opposite conductivity types.

As shown, the gate dielectric layer 210 (also referred to as referred to as either "gate dielectric" or gate oxide") establishes a charge modulation region or charge accumulation region shown by the dashed box where free carriers (e.g., electrons and holes) flow into and out of the p-doped and n-doped waveguides 205 and 215. Doing so creates an active region where the switching function associated with the modulator 200 (e.g., switching speeds above 1 Gb/s) can be controlled by a voltage potential across the gate dielectric layer 210. In one embodiment, the voltage potential is used to alter the phase of the optical signal propagating through the modulator as in, for example, a Mach-Zehnder interferometers (MZI). However, the modulators described herein may also be used in other types of devices such as ring resonators, Fabry-Perot cavities, etc.

The gate dielectric layer 210 may be referred to as either "gate dielectric" or gate oxide" where it is to be understood that an oxide is only an exemplary form of a dielectric that may be used in the modulator device. The gate dielectric layer 210 may comprise any material that allows for fast charging/discharging of the free carries (e.g., enables switching speeds greater than or equal to 1 Gb/s). A non-limiting list of suitable materials include hafnium oxide, oxynitride, bismuth oxide, silicon nitride, silicon oxide, undoped polysilicon, and combinations of these materials. Furthermore, using high-K dielectric materials as the gate dielectric provide higher capacitance and greater charge densities over using dielectrics with lower dielectric constants (assuming same thickness and voltage potential). For example, hafnium oxide and silicon nitride (high-K dielectrics) have higher dielectric constants than silicon dioxide, and thus, enable greater charge densities across the gate dielectric layer relative to using silicon dioxide. Using the higher voltages may increase the modulation efficiency—i.e., the amount the optical signal is phase shifted relative to the applied voltage.

In one embodiment, the gate layer 210 includes a combination of two dielectrics—e.g., silicon dioxide and silicon nitride or silicon dioxide with hafnium oxide. Furthermore, the silicon dioxide may first be formed in the region 210 by using a thermal oxidization process to grow a thin layer of silicon dioxide on the sides of the gate layer 210 facing right and left waveguides 205, 215 (assuming these waveguides are formed from silicon). In a subsequent processing step, the other dielectric material (e.g., silicon nitride, hafnium oxide, or any of the other suitable dielectrics discussed above) is deposited to form the gate dielectric layer 210.

Although the Figures described herein illustrate placing a gate dielectric layer 210 between the opposite doped waveguides 205, 215, this is not a requirement. For all the embodiments described herein, the modulators may still perform optical modulation if the gate dielectric layer 210 is omitted and the two waveguides directly contact to form a PN junction. In this example, the PN junction establishes the charge modulation region where the free carriers flow into and out of the waveguides. However, including the gate dielectric layer 210 may improve the efficiency of the optical modulation.

The waveguides 205 and 215 include wing portions 207A and 207B and ridge portions 240A and 240B. As such, each waveguide 205, 215 includes a trench 220 between their respective wing portions 207 and ridge portions 240. Filling the trenches 220 with the dielectric material 230 may improve the lateral confinement of the optical mode relative to if the trenches 220 were omitted and the waveguides have top surfaces that form a single plane. In this manner, the depth of the trenches determines the shape of the optical mode of the signal propagating through the modulator. Although not shown here, the wing portions 207 may include electrical connections that enable the modulator 200 to set the voltage across the gate dielectric region 210. The depth of the trenches 220 also affects the electrical resistance between the wing portions 207 and the charge modulation region.

In one embodiment, instead of the ends of the waveguides 205, 215 being raised to create the wing portions 207, the ends may remain at the same thickness as the portions of the waveguides 205, 215 beneath the trenches 220. Stated differently, in this example, the thickness of the waveguides 205, 215 would remain constant until reaching the respective edge of the waveguides 205, 215 that is opposite the side with the ridges 240A and 240B. Regardless of the particular structure of the waveguides 205, 215, the thickness of the ridge portions 240 and wing portions 207 may range from 50 to 200 nanometers while the thickness of the waveguides 205, 215 below the trenches 220 may range from 20 to 100 nanometers.

In one embodiment, the width of the gate dielectric region ($W_{GATE}$) 210 is less than 15 nanometers and in one embodiment, is between 2-5 nanometers. The thickness of the region 210 may range from 50 nanometers to 200 nanometers. The gate dielectric region 210 is shown with substantially vertical side edges, but given the small width of this region 210 and the limitations of fabrication techniques to form the region 210, the edges may be slightly tapered such that the width of the gate region 210 is smaller near the insulation layer 110 than at the top surface of the ridges 240. Although the gate dielectric region 210 creates a substantially vertical charge modulation region, region 210 fundamentally works in the same manner as if the dielectric region 210 were disposed between upper and lower waveguides (e.g., a horizontal capacitor structure). That is, free carriers (e.g., electrons and holes) flow into and out of the p-doped and n-doped waveguides 205 and 215 and create an active region where the switching function associated with the modulator 200 can be controlled (e.g., provides switching speeds above 1 Gb/s).

Figure 3:
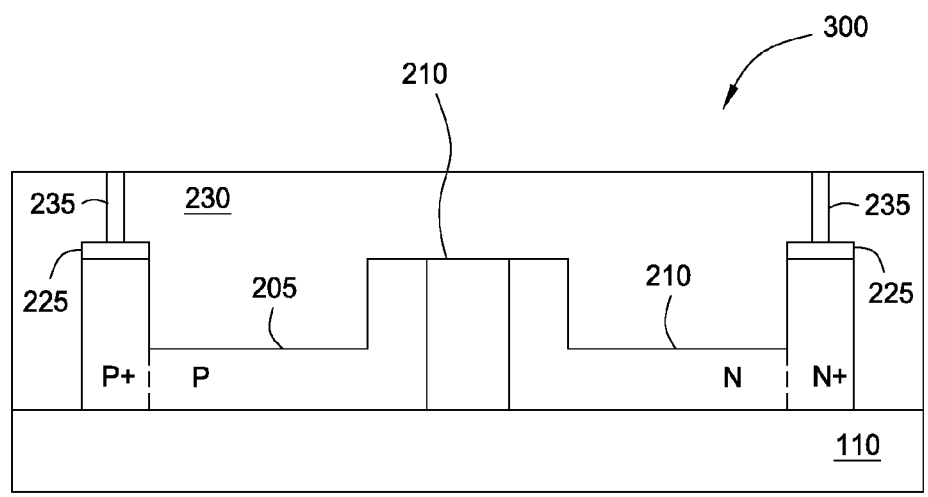
FIG. 3 illustrates a cross-sectional view of a modulator with electrical connections, according to one embodiment disclosed herein.

FIG. 3 illustrates a cross-sectional view of a modulator 300 with electrical connections, according to one embodiment disclosed herein. Respective widths of the waveguides 205 and 215 may be selected to keep electrical contacts 225, which may be metallic or formed from silicide, and vias 235 out of the optical mode. Because electrically conductive materials have high absorption coefficients, the waveguides 205 may be designed such that any conductive contacts are sufficiently outside the boundaries of the optical mode. Moreover, the portions of the waveguides 205, 215 proximate to the contacts 225 are more heavily doped than the portions of the waveguide 205, 215 where optical modulation occurs. Doing so may improve the electrical connection between the silicon-based waveguides 205, 215 and the contacts 225 thereby lowering the electrical resistance and RC constant associated with the modulator 300. Heavily doping the portion of the waveguides proximate to the electrical connection to an external voltage source may be applied to any of the embodiments described herein. Furthermore, the concentration of the dopant may increase in the waveguides 205, 215 as the distance from the optical mode increases. Because the dopant may have a deleterious effect on the optical signal, the dopant concentration in the waveguides 205 and 215 where the optical mode is located may be lightly doped. The dopant concentration may be increased in a step-wise or continuous manner as the distance from the optical mode increases. Doing so improves the electrical conductivity of the waveguides 205 and 215 and mitigates the negative affect the dopant has on the optical signal. Furthermore, in one embodiment, the electrical contacts 225 are omitted and the vias 235 contact the heavily doped portions of the waveguides 205, 215 directly.

Figure 4A:
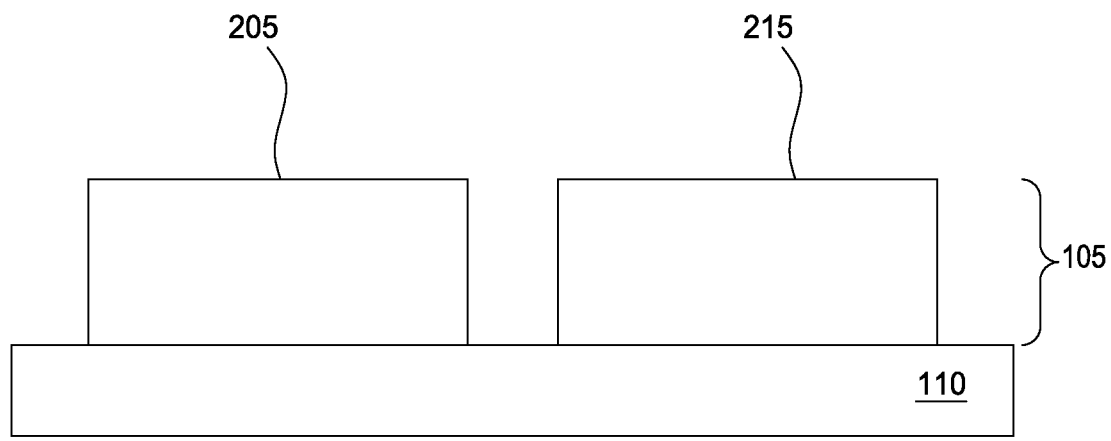
FIGS. 4A-4F illustrate a flow for fabricating the modulator with the vertical charge modulation region, according to one embodiment disclosed herein.

FIGS. 4A-4F illustrate a flow for fabricating the modulator with the vertical charge modulation region, according to one embodiment disclosed herein. In FIG. 4A, a crystalline silicon upper layer 105 of a SOI structure (i.e., a single crystalline substrate) is etched to form the right and left waveguides 205 and 215. Because the upper layer 105 is crystalline silicon, both of the waveguides 205 and 215 are also crystalline silicon. In the horizontal capacitor structures where there are upper and lower waveguides, it is difficult and/or expensive (and in some cases, impossible) to form an upper waveguide on top of a lower electrode where the upper waveguide is made from crystalline silicon. As such, in these structures, the lower waveguide is crystalline silicon while at least a portion of the upper waveguide is not—e.g., the upper waveguide is polycrystalline silicon. However, because the waveguides 205, 215 are disposed along a common horizontal plane to form a vertical capacitor structure, it is relatively inexpensive to etch the waveguides 205, 215 from the same crystalline silicon material—i.e., silicon surface layer 105. In one embodiment, the step of forming the right and left waveguides 205, 215 in FIG. 4A may be a result of a single etching step. Having both waveguides 205, 215 made from single crystal silicon provides advantages over other modulators where at least one waveguide is not made from crystalline silicon. One such advantage is that using waveguides that are both made from crystalline silicon may reduce optical loss in the modulator for a given bandwidth.

Figure 4B:
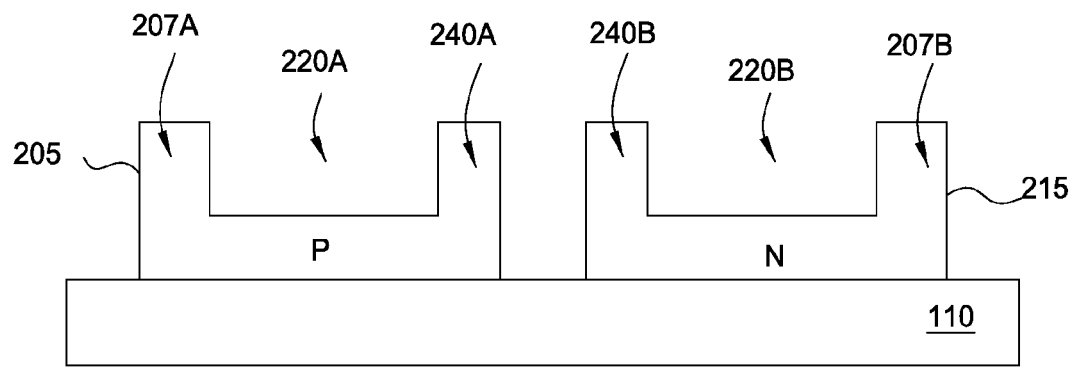

FIG. 4B illustrates patterning and etching each waveguide 205, 215 to form the wing portions 207, trenches 220 and ridge portions 240 as described above. If the wing portions 207 and ridge portions 240 are the same thickness, then these structures can be formed in the same etching step. If not, then multiple patterning and etching steps are used. Moreover, by etching the trenches 220A and 220B into the waveguides 205, 215, respectively, the later confinement of optical mode may be improved.

Either before or after the wing portions 207, trenches 220 and ridge portions 240 are formed, the waveguides 205, 215 are doped using dopants with opposite conductivity types. Although the leftmost waveguide 205 is shown as being P-type while the rightmost is shown as N-type, reversing the doping types is also possible.

Figure 4C:
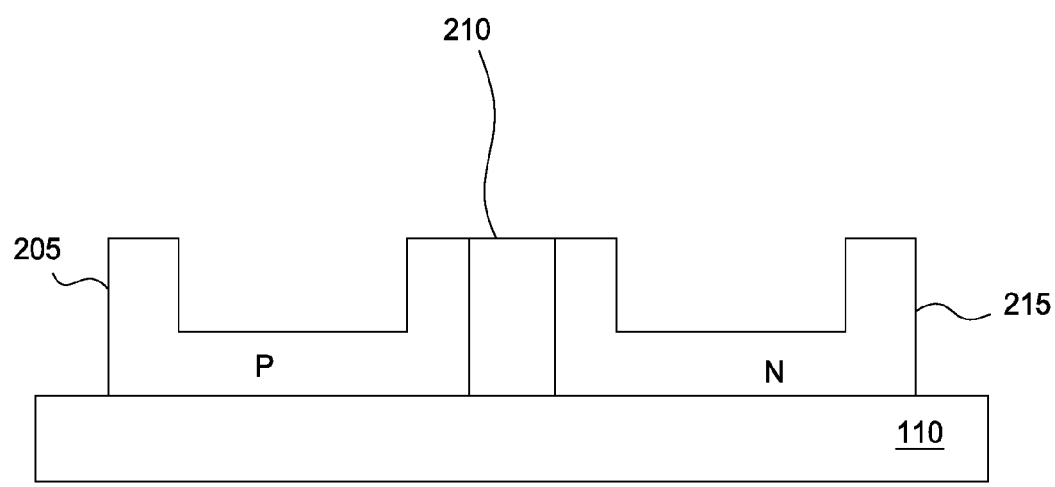
Figure 4D:
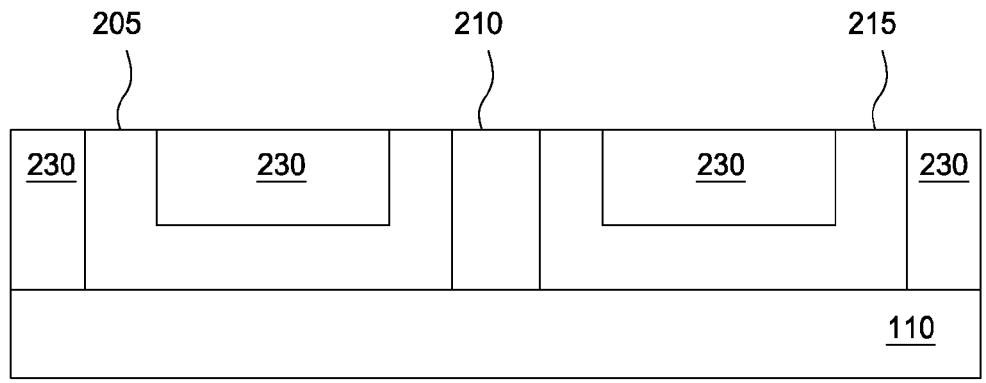

In FIG. 4C, the gate dielectric material, which may include any of the same materials that are used in the gate dielectric layers described above, is deposited into the gap between the right and left waveguides 205 and 215. For example, instead of being a single material, the gate dielectric may include a combination of two materials such as thermally grown silicon dioxide and silicon nitride or hafnium oxide. As such, FIG. 4C may be divided into two processing steps. In the first step, a thin layer of silicon oxide is grown on the surfaces of the waveguides 205, 215 facing the gate layer 210. In the second step, another dielectric material is deposited between the silicon dioxide to fill in the gate layer 210. In FIG. 4D, dielectric material 230 is deposited onto the modulator and then planarized to form a planar top surface. By depositing the dielectric material 230 into the trenches 220, the sides of the ridge portions 240 facing the trenches 220 may have a boundary with an associated refractive index that laterally confines the optical mode of the signal propagating in the modulator.

Figure 4E:
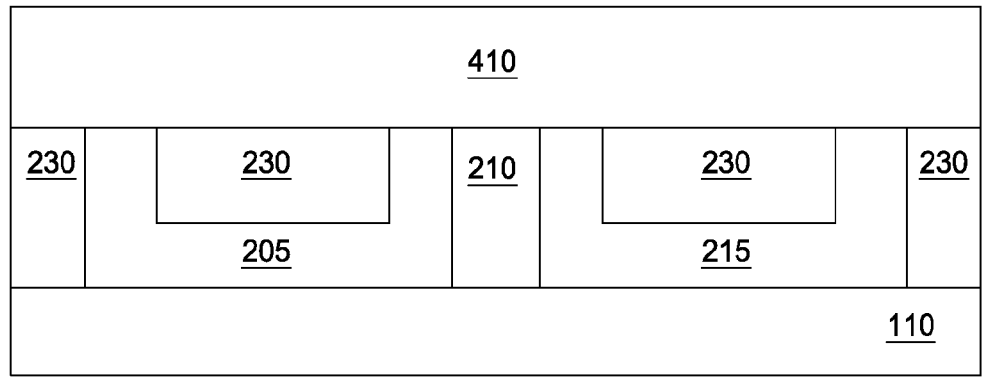

In FIG. 4E, a capping layer 410 is deposited onto the planar surface. The capping layer 410 may include any dielectric material with a refractive index that provides confinement of the optical signal traveling in the waveguides 205, 215 and the gate dielectric region 210. In one embodiment, the capping layer 410 is made up of silicon nitride.

Figure 4F:
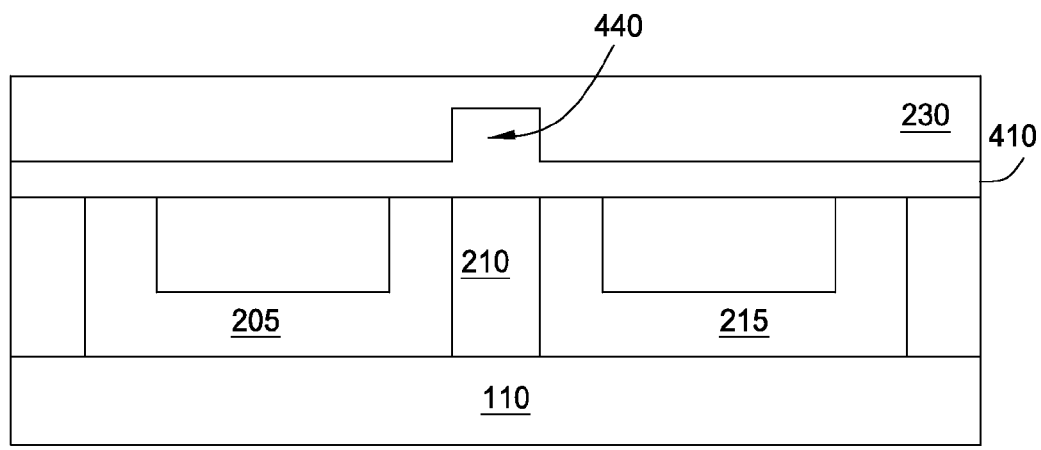

In FIG. 4F, the capping layer 410 may be etched to form the ridge portion 440 that is centered or aligned with the gate dielectric region 210. Specifically, the width of the ridge portion 440 may be approximately equal to or greater than the width of the gate dielectric region 210. Nonetheless, both the width and the thickness of the ridge portion 440 may be set to alter the lateral and vertical confinement of the optical mode. Doing so may shift the optical mode so that the greatest intensity of the optical signal lies within the charge modulation region.

As shown in FIG. 3, modulators illustrated in FIGS. 4D, 4E, and 4F may be modified to include electrical connections preferably located outside the boundaries of the optical mode. For example, electrical contacts may be placed on the top surface of the wing portions 207 of the waveguides 205 and 215. Vias may then connect the electrical contacts to respective voltage sources. These electrical connections may be formed after any of the process steps shown in FIG. 4D, 4E, or 4C.

Figure 5A:
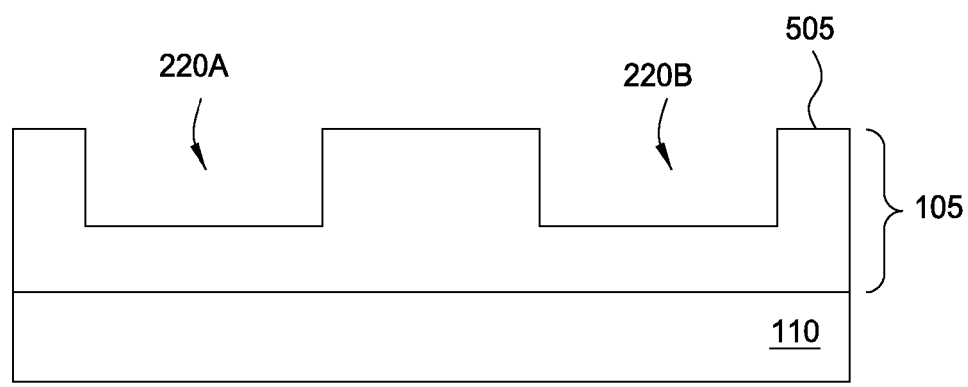
FIGS. 5A-5E illustrate a flow for fabricating the modulator with the vertical charge modulation region, according to one embodiment disclosed herein.
Figure 5B:
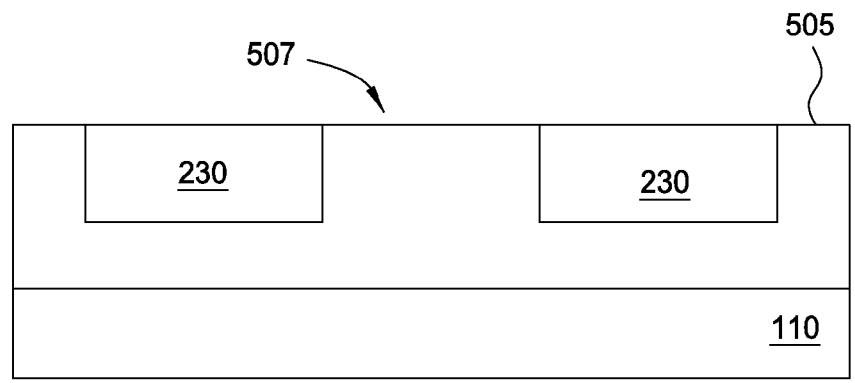

FIGS. 5A-5E illustrate a flow for fabricating the modulator with the vertical charge modulation region, according to one embodiment disclosed herein. As shown in FIG. 5A, a unitary portion of crystalline semiconductor (e.g., the silicon surface layer 105) is etched to form the structure 505 which includes the trenches 220. As described above, the depth of the trenches 220 may be optimized based on electrical resistance of the waveguides 205, 215 and for mode shape control. In FIG. 5B, the trenches 220 are filled with a dielectric material 230 as described above. In one embodiment, the upper surface 507 is planarized using, for example, a CMP.

Figure 5C:
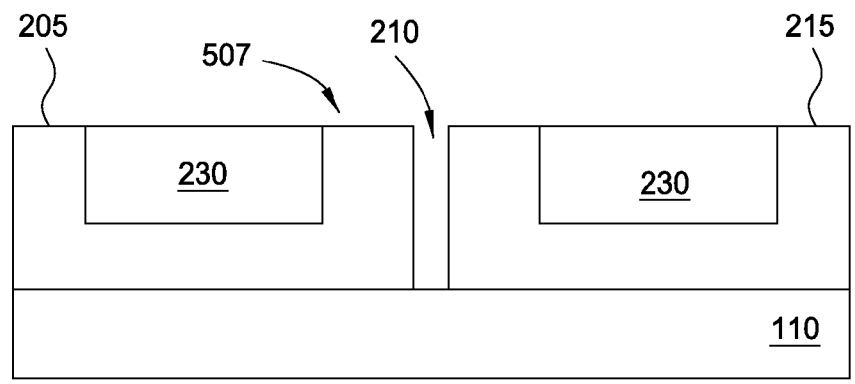
Figure 5D:
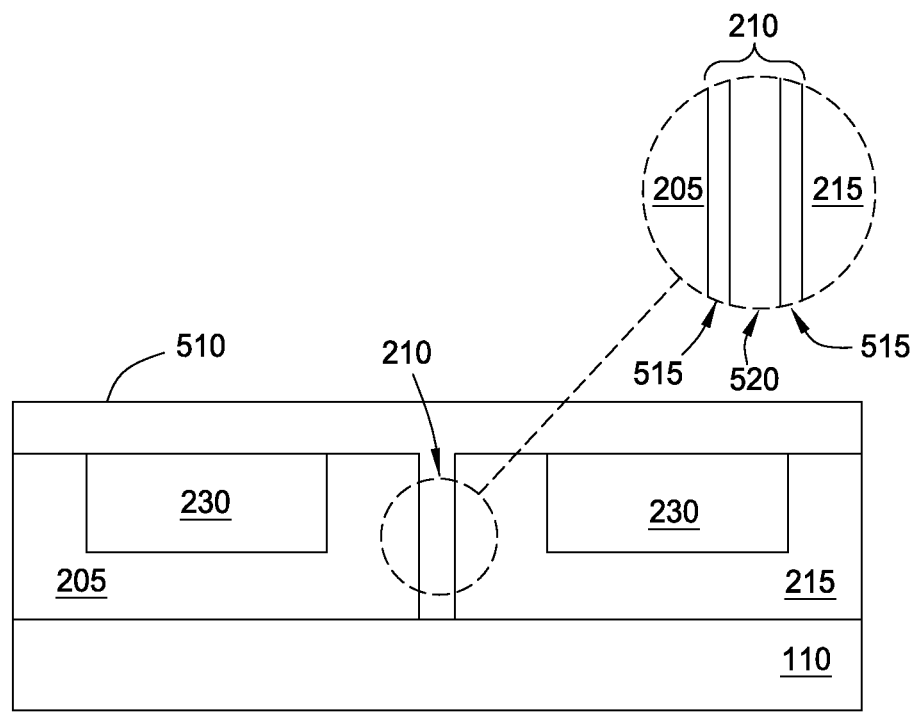

In FIG. 5C, the region 210 for the gate dielectric layer is etched into the structure 505 to form the left waveguide 205 and the right waveguide 215. As discussed above, due to limitations in processing, the walls of the region 210 may have a taper such that the width of the gap is narrower near the insulation layer 110 than the top surface 507. In FIG. 5D, the dielectric material 510 is deposited into the gate dielectric layer 210. In addition to depositing the dielectric material 510 within the region 210, the material 510 is also deposited onto the top surface 507 however this is not a requirement.

Moreover, like in FIG. 4C, the material 510 of the gate layer 210 may include one or multiple different dielectric material that may be deposited in separate processing steps. For example, using a thermal process, silicon dioxide may be formed on the surfaces of the waveguides 205, 215 forming the layer 210 while in a subsequent step a different dielectric is deposited between the waveguides 205, 215 in the gate layer 210 and onto the top surface 507. This is shown in the blow-out bubble in FIG. 5D. This expanded view illustrates that the gate dielectric layer 210 includes two dielectric materials deposited in two different process steps. For instance, the dielectric material 515 may first be formed in the gap between the waveguides 205 and 215. In one example, the surfaces of the silicon waveguides 205 and 215 are subjected to a thermal oxidization process to form a thin layer of silicon dioxide which functions as dielectric 515. The gap between the two layers of dielectric 515 may then be filled with dielectric material 520. To do so, the dielectric material 520 (e.g., silicon nitride, hafnium oxide, undoped polysilicon, etc.) may be deposited into the gap. Forming a thin oxide 515 before depositing additional dielectric material 520 may improve the optical properties of the interface between the waveguides 205, 215 and the gate layer 210 relative to depositing a single dielectric material into the gap.

Figure 5E:
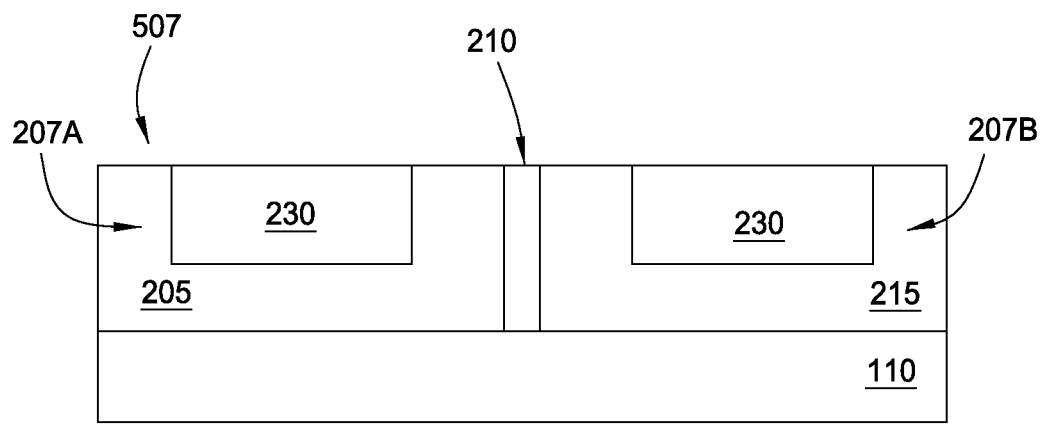

In FIG. 5E, the modulator is planarized to expose the top surface 507 of the waveguides 205, 215. That is, any excess dielectric material 510 may be removed, however, this step is optional. In another embodiment, only portions of the dielectric material 510 shown in FIG. 5D are selectively removed to allow, for example, the electrical connections to be formed on the wing portions 207.

Figure 6A:
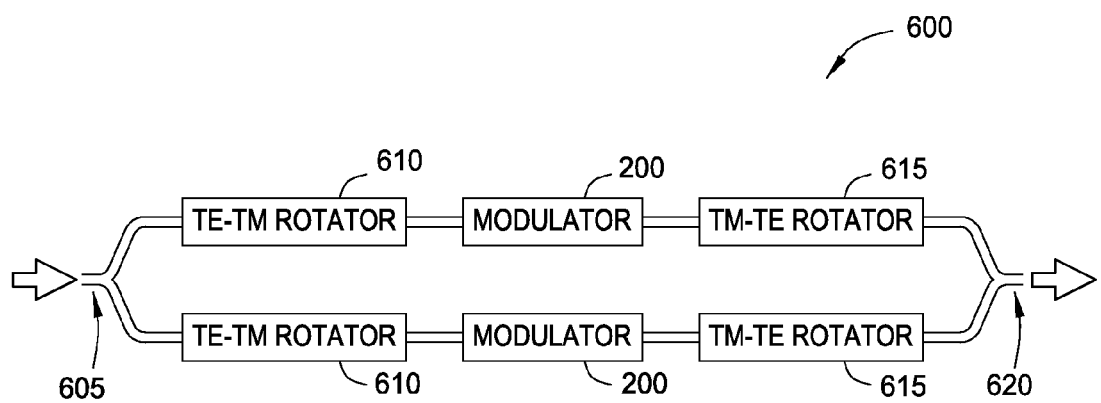
FIGS. 6A-6B illustrate Mach-Zehnder interferometers with polarization converters, according to embodiments disclosed herein.
Figure 6B:
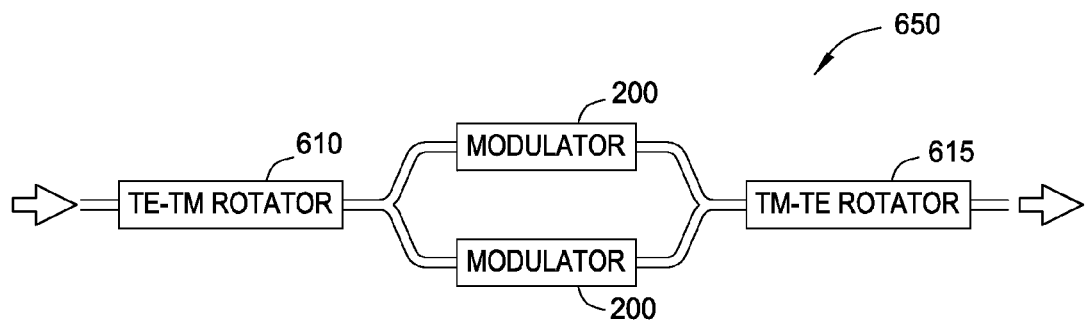

FIGS. 6A-6B illustrate Mach-Zehnder interferometers (MZI) with polarization converters, according to embodiments described herein. Specifically, FIG. 6A illustrates an MZI 600 that includes an input 605 that receives an optical signal (e.g., a continuous wave) and an output 620 that transmits an optical signal that is modulated based on the electrical signals used to drive the modulators 200. In this example, the optical signal has a transverse electric (TE) mode which may be preferred in some optical systems (i.e., a chip) over a transverse magnetic (TM) mode. However, it may be desired to use a modulator 200 in the MZI that is optimized for a TM modal signal rather than a TE modal signal. As such, after the y-splitter, the MZI 600 includes respective TE-TM rotators 610 in each of the branches that convert the optical signal from having a TE mode to a TM mode. This converted optical signal then passes through the modulators 200 and is reconverted to an optical signal with a TE mode by the TM-TE rotators 615. The reconverted optical signals are then recombined at the y-splitter to form a modulated optical signal that has a TE mode. FIG. 6B illustrates an MZI 650 that performs the same function as MZI 600 but the TE-TM rotator 610 is located to the left of the leftmost y-splitter while the TM-TE rotator 615 is located to the right of the rightmost y-splitter.

In one embodiment, the TE-TM rotators 610 and the TM-TE rotators 615 may be specially designed portions of the waveguides in the MZIs 600, 650 (e.g., silicon waveguides) which, by virtue of their structure, convert the optical signal from TE mode to TM mode and vice versa. Alternatively, these rotators 610, 615 may be separate components that are inserted or fabricated between portions of the waveguides in the MZIs 600, 650 to perform the respective conversions.

Although MZI 600 and MZI 650 are shown including modulator 200, the same MZI system may be used with any of the modulators discussed herein—e.g., the modulators shown in FIGS. 3 and 4F. Moreover, Further still, for optical systems that primarily use an optical signal having a TM mode, it may be preferred to use a modulator optimized for TE mode optical signal in an MZI. In which case, the reverse of what is shown in FIGS. 6A and 6B is true—i.e., the MZI would include at least one TM-TE rotator 615 upstream from the modulator 200 and at least one TE-TM rotator 605 downstream from the modulator 200.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems or methods It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

What is claimed is:

1. An optical device, comprising:
   a right crystalline silicon waveguide disposed on a dielectric substrate;
   a left crystalline silicon waveguide disposed on the dielectric substrate, wherein the right and left waveguides are disposed on a same plane defined by the dielectric substrate, and wherein the right and left waveguides have respective, opposing first and second sides; and
   a vertical region separating the right and left waveguides, the vertical region extending vertically from the dielectric substrate to an upper surface of one of the right and left waveguides opposite a lower surface contacting the dielectric substrate, wherein the vertical region is filled with a dielectric material contacting the respective first sides of the left and right waveguides,
   wherein the left and right waveguides comprise respective raised wing portions that extend in a direction away from the dielectric substrate, the wing portions are located at the respective second sides of the left and right waveguides,
   wherein the left waveguide is doped a first conductivity type and the right waveguide is doped a second, different conductivity type.

2. The optical device of claim 1, wherein the vertical region has a width that is less than 15 nanometers.

3. The optical device of claim 1, wherein a first electrical connection is coupled to an upper surface of the wing portion of the left waveguide and a second electrical connection is coupled to an upper surface of the wing portion of the right waveguide.

4. The optical device of claim 1, wherein the respective wing portions are more heavily doped with the first and second conductivity types, respectively, relative to remaining portions of the left and right waveguides.

5. The optical device of claim 1, wherein a dielectric ridge at least partially overlaps the vertical region, wherein a width of the dielectric ridge is equal to or greater than a width of the vertical region.

6. The optical device of claim 5, wherein the dielectric ridge comprises silicon nitride.

7. An optical device, comprising:
   a right waveguide disposed on a dielectric substrate;
   a left waveguide disposed on the dielectric substrate, wherein the right and left waveguides are disposed on a same plane defined by the dielectric substrate, wherein the left waveguide is doped a first conductivity type and the right waveguide is doped a second, different conductivity type, and wherein the right and left waveguides have respective, opposing first and second sides;
   a vertical region separating the right and left waveguides, the vertical region extending vertically from the dielectric substrate to an upper surface of one of the right and left waveguides opposite a lower surface contacting the dielectric substrate, wherein the vertical region is filled with a dielectric material contacting the respective first sides of the left and right wavequides, wherein the left and right wavequides comprise respective raised wing portions that extend in a direction away from the dielectric substrate, the wing portions are located at the respective second sides of the left and right waveguides; and
   a dielectric ridge at least partially overlapping the vertical region, wherein a width of the dielectric ridge is equal to or greater than a width of the vertical region.

8. The optical device of claim 7, wherein the vertical region has a width that is less than 15 nanometers.

9. The optical device of claim 7, further comprising a dielectric capping layer at least partially overlapping the left and right waveguides, wherein the dielectric ridge is a feature of the dielectric capping layer.

10. The optical device of claim 7, wherein the dielectric ridge comprises silicon nitride.

* * * * *